United States Patent
Valtchev et al.

(10) Patent No.: US 7,724,746 B2
(45) Date of Patent: May 25, 2010

(54) METHOD AND SYSTEM FOR PROVIDING LOAD BALANCED TRAFFIC IN REDUNDANT INFINIBAND ETHERNET GATEWAYS NETWORK

(75) Inventors: Vasil Valtchev, Santa Clara, CA (US); Wenhui Zhao, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 519 days.

(21) Appl. No.: 11/462,024

(22) Filed: Aug. 2, 2006

(65) Prior Publication Data

US 2008/0031249 A1 Feb. 7, 2008

(51) Int. Cl.
*H04L 12/28* (2006.01)

(52) U.S. Cl. .................. 370/392; 370/401; 370/237; 709/249; 709/238; 709/229

(58) Field of Classification Search .............. 370/229, 370/230–232, 236, 437, 465, 469, 401, 395.3, 370/395.31, 395.32, 466, 471; 387/63; 709/238, 709/227–229, 249
See application file for complete search history.

(56) References Cited

U.S. PATENT DOCUMENTS

| | | | |
|---|---|---|---|
| 5,983,281 A * | 11/1999 | Ogle et al. | 709/249 |
| 6,178,160 B1 | 1/2001 | Bolton et al. | |
| 6,742,044 B1 | 5/2004 | Aviani et al. | |
| 6,985,956 B2 * | 1/2006 | Luke et al. | 709/229 |
| 7,099,915 B1 | 8/2006 | Tenereillo et al. | |
| 7,185,067 B1 | 2/2007 | Viswanath et al. | |
| 7,328,237 B1 | 2/2008 | Thubert et al. | |
| 7,451,209 B1 | 11/2008 | Schieber et al. | |
| 7,512,702 B1 | 3/2009 | Srivastava et al. | |
| 2004/0133634 A1 * | 7/2004 | Luke et al. | 709/203 |

OTHER PUBLICATIONS

"Unified Fabric: Benefits and Architecture of Virtual I/O," Cisco Systems, Inc., Sep. 2005, pp. 1-8.

* cited by examiner

*Primary Examiner*—Chi H Pham
*Assistant Examiner*—Kouroush Mohebbi
(74) *Attorney, Agent, or Firm*—Cesari and McKenna, LLP; Michael R. Reinemann (57) ABSTRACT

Method and system for providing load balancing in Infiniband-to-Ethernet networks including detecting a data traffic request, determining a network interface port information associated with the detected data traffic request, and selecting a network gateway based on the network interface port information is disclosed.

21 Claims, 5 Drawing Sheets

METHOD AND SYSTEM FOR PROVIDING LOAD BALANCED TRAFFIC IN REDUNDANT INFINIBAND ETHERNET GATEWAYS NETWORK

FIELD OF THE INVENTION

The present invention relates to data network management. More specifically, the present invention relates to method and system for providing load balanced data traffic in redundant Infiniband-to-Ethernet gateways in data networks.

BACKGROUND

Infiniband (IB) is an industry standard channel based architecture that features high speed, low latency interconnects for distributed computing infrastructure. Hosts with infiniband host adapter can be connected by infiniband switch. Infiniband to Ethernet gateway is typically used to connect infiniband network with traditional Ethernet network.

For high availability, two or more IB-to-Ethernet gateways can be used in redundant mode. The IB-to-Ethernet gateways can be in active/standby mode where only one gateway is actively handling data traffic. Alternatively, the IB-to-Ethernet gateways may be configured to work in active/active mode where data traffic is load balanced among the IB-to-Ethernet gateways.

Broadly, the IB-to-Ethernet gateways are configured as a layer 2bridge, and ARP (Address Translation Protocol) relay is used to bridge the infiniband and the Ethernet networks. Typically, target/destination IP address in ARP request is used to determine which IB-to-Ethernet gateway to handle the data traffic. Further, traffic between a pair of hosts or network devices such as client terminals may use different IB-to-Ethernet gateways depending upon which host initiated the data traffic.

Typically, the Ethernet side of the network includes a router as the default router for all IB hosts. IB hosts use the default router as the next hop to communicate with hosts in the other networks. If the IB host initiates the data traffic, the IB host will send ARP request using the router's IP address as the target IP address. As a result, all IB hosts will result in using the same IB-to-Ethernet gateway to communicate with hosts in the other networks (for example, the hosts on the Ethernet side).

In view of the foregoing, it would be desirable to have methods and systems for providing improved data traffic load balancing among redundant IB-to-Ethernet gateways.

SUMMARY OF THE INVENTION

In accordance with the various embodiments of the present invention, there are provided methods and systems for providing load balanced traffic in redundant IB-to-Ethernet gateways by, for example, maintaining one pair of source and destination IP addresses using a fixed gateway, and avoiding all hosts in the network from using one IB-to-Ethernet gateway in the data network.

These and other features and advantages of the present invention will be understood upon consideration of the following detailed description of the invention and the accompanying drawings.

DETAILED DESCRIPTION

Figure 1:
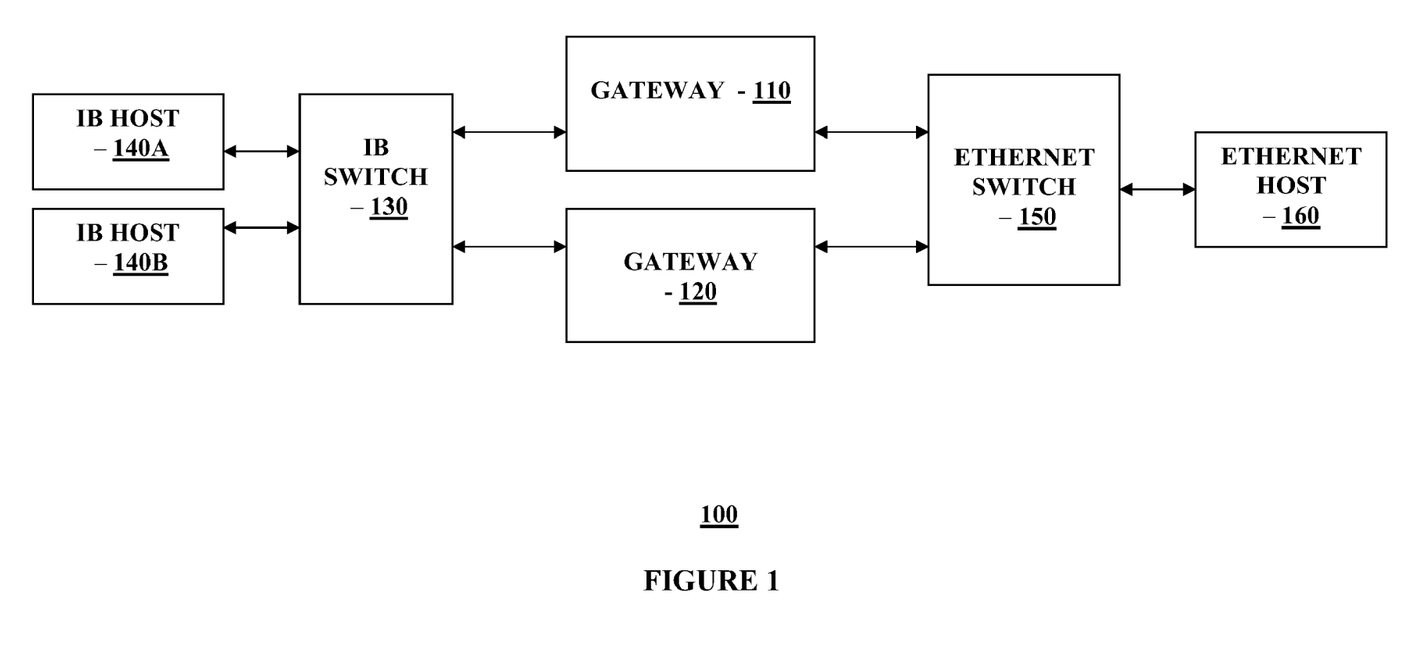
FIG. 1 is a block diagram of an overall data network for practicing one or more embodiments of the present invention.

FIG. 1 is a block diagram of an overall data network for practicing one or more embodiments of the present invention. Referring to FIG. 1, data network 100 in one embodiment includes Infiniband (IB) host terminals 140A, 140B, each operatively coupled to an Infiniband (IB) switch 130. In one embodiment, the infiniband (IB) switch 130 includes an IB switch fabric configured to connect all IB hosts and network devices with an Infiniband interface. Each of the IB host terminals 140A, 140B may include a network device, each of which includes an Infiniband interface to connect to the IB switch 130. While only two IB host terminals 140A and 140B are shown in FIG. 1, within the scope of the present invention, more or less numbers of IB host terminals may be provided for practicing one or more embodiments of the present invention.

Referring back to FIG. 1, also shown in FIG. 1 is gateway 110 and gateway 120, each of which are configured to include in IB interface and an Ethernet interface. More specifically, as can be seen from FIG. 1, each of the gateway 110 and gateway 120 are operatively coupled to the IB switch 130. In addition, each of the gateway 110 and gateway 120 are further operatively coupled to an Ethernet switch 150, where the Ethernet switch 150 is configured as an Ethernet switch fabric to network devices and host terminals with Ethernet interface in the data network 100. For example, as can be seen from FIG. 1, there is provided an Ethernet host terminal 160 which is configured to include an Ethernet interface, and which is configured to operatively couple to the Ethernet switch 150.

Referring again to FIG. 1, each IB host terminal 140A, 140B, and the Ethernet host terminal 160 maintains an ARP table to map IP addresses, with hardware addresses. That is, the IB host terminal 140A, 140B, and the Ethernet host terminal 160 need to have an ARP entry before the respective host terminal can start to send data traffic to a destination host. In the case of a particular IP address for which an ARP entry does not exist, the host terminals are configured to send a broadcast ARP request for the hardware of the particular IP address.

For example, in one embodiment, IB host terminal 140A is configured with an IP address of 1.1.1.1 and a hardware address of H1, while IB host terminal 140B is configured with an IP address of 1.1.1.2 and a hardware address of H2. Moreover, the Ethernet host terminal 160 is configures with an IP address of 1.1.1.3 and a hardware address of H3. In addition, gateway 110 may be configured with an IP address of 1.1.1.10, and a hardware address of H10.IB on the IB interface, and a hardware address of H10.Eth on the Ethernet interface, while gateway 120 may be configured with an IP address of 1.1.1.20, with a hardware address of H20.IB on the IB interface, and a hardware address of H20.Eth on the Ethernet interface.

In addition each of the gateways 110, 120 are configured to maintain a query table and an address table, where, for each data traffic the query table includes a data traffic identification (ID), a target protocol address (TPA), a source protocol address (SPA), a data traffic port in and port out information, and a status field (Flag). Further, each address table of the gateways 110, 120 are configured to maintain, for each data traffic, a corresponding source IP address, source hardware address, the interface port information, and a status field (Flag). As discussed in further detail below, the query table and the address table are updated based on the data traffic received and/or transmitted by the corresponding gateway 110 or gateway 120.

Referring back to FIG. 1, in one embodiment, when the IB host terminal 140A transmits an ARP request packet with a target protocol address (TPA) of 1.1.1.3, a source protocol address (SPA) of 1.1.1.1, and a source hardware address (SHA) of H1, the broadcast ARP request packet is switched by the IB switch 130 and sent to both gateway 110 and gateway 120. The gateways 110 and 120 perform a load balancing algorithm to determine which of the two gateways 110, 120 will handle the coming traffic associated with the ARP request packet from the host terminal 140A.

More specifically, in one embodiment of the present invention, the load balancing procedure to determine which gateway will handle the data traffic associated with the received ARP Request packet is determined based on applying a predetermined hash function to the source protocol address and the number of gateways in the Infiniband-to-Ethernet network. For example, referring back to FIG. 1, gateway 110 is associated with an identification parameter (ID) of 1, while gateway 120 is associated with an identification parameter (ID) of 0. When the hash function is applied to the source protocol address (SPA) which, in this case would be 1.1.1.1 (for the ARP request packet from the IB host terminal 140A), an index value between zero and the number of gateways subtracted by one (1) is returned, where the index value corresponds to the identification parameter (ID) of one of the gateways in the network which is configured to handle the data traffic associated with the ARP request packet.

For example, in one embodiment, the hash function in one embodiment may include converting the source protocol address(e.g., 1.1.1.1) to a corresponding hexadecimal integer value of 0x01010101, which is divided by the number of gateways, and resulting in a remainder value. That is, the hexadecimal integer value 0x01010101 divided by two (i.e., two gateways 110 and 120) returns a remainder of one. Accordingly, the gateway associated with an identification parameter (ID) of one (1) is determined to handle the data traffic associated with the ARP request packet from the IB host terminal 140A.

Referring back to FIG. 1, gateway 110 is configured to generate an entry in the address table associated with the received ARP request packet, for example, the source protocol address (SPA) and the source hardware address(SHA). In addition, the gateway 110 is configured to generate an entry in its query table associated with the received ARP request packet, such as, for example, the target protocol address (TPA)(IP address: 1.1.1.3), source protocol address(SPA)(IP address: 1.1.1.1), port out information as Ethernet port, and the port in information as IB port, with the status field (Flag) as "Pending" which is configured to indicate that the associated query is not resolved. In one aspect, when the gateway 110 receives the ARP reply from the destination host (e.g., the Ethernet host terminal 160), the status of the query is considered to be resolved. One example of the query table is shown below:

TABLE 1

Gateway 120 Query Table

| ID | TPA | SPA | Port Out | Port In | Flag |
|---|---|---|---|---|---|
| 1 | 1.1.1.3 | 1.1.1.1 | Ethernet | IB | Pending |

Referring back to FIG. 1, after updating the query table, gateway 110 is configured to transmit the ARP request packet to the Ethernet side with the target protocol address (TPA) of 1.1.1.3, the source protocol address (SPA) of 1.1.1.10, and the source hardware address (SHA) of H10Eth. That is, in one embodiment, the source protocol and hardware addresses of the gateway 110 is used as the corresponding source protocol address (SPA) and the source hardware address (SHA) for the ARP request packet to the transmitted to the Ethernet host terminal 160.

Referring again to FIG. 1, the Ethernet host terminal 160 in one embodiment is configured to receive the ARP request packet from gateway 110 switched by the Ethernet switch 150, and to transmit a unicast ARP reply back to the gateway 110 with target protocol information as the IP address of the gateway 110 (for example, TPA of 1.1.1.10), and the source protocol information as the Ethernet host terminal 160 (for example, SPA of 1.1.1.3, and SHA of H3).

Upon receipt of the unicast ARP reply from the Ethernet host terminal 160, the gateway 110 is configured in one embodiment to resolve the associated entry in the query table by updating the status field (Flag)to change from "Pending" to "Resolved". In addition, the gateway 110 is configured to generate an additional entry in the address table corresponding to the received ARP reply associated with an IP address of 1.1.1.3, and the hardware address of H3. An example of the address table is shown below:

TABLE 2

Gateway 110 address table

| ID | IP Address | Hardware Address | Port | Flag |
|---|---|---|---|---|
| 1 | 1.1.1.1 | H1 | IB | 0 |
| 2 | 1.1.1.3 | H3 | Ethernet | 0 |

Referring back again to FIG. 1, after updating the address table, gateway 110 in one embodiment is further configured to transmit the ARP reply received from the Ethernet host terminal 160 to the IB host terminal 140A with a target protocol address of the IB host terminal 140A (TPA: 1.1.1.1), and source protocol address of the Ethernet host terminal 160 (SPA: 1.1.1.3), and source hardware address of the gateway 110(SHA: H10IB). The IB terminal 140A then receives the ARP reply from the gateway 110 and is configured to generate an ARP entry associated with the IP address and hardware address of the received ARP reply.

That is, in one embodiment, the ARP table of the host terminal 140A is updated in one embodiment to include an entry associated with initial ARP request packet to include an IP address of the destination IP address (for example, the IP address of the Ethernet host 160), and the gateway 110 hardware address (for example, H10.IB). In this manner, data traffic from the IB host terminal 140A to the Ethernet host 160 is configured in one embodiment to use the hardware address H10.IB. An example of the ART table for the host terminal 140A is shown below in Table 3.

TABLE 3

IB Host Terminal ARP Table

| ID | IP Address | Hardware Address |
|----|------------|------------------|
| 1  | 1.1.1.3    | H10.IB           |

Referring yet again to FIG. 1, in the case where the Ethernet host 160 initiates data traffic destined for IB host terminal 140A, the Ethernet host terminal 160 is configured to transmit an ARP request packet with the target protocol address (TPA) of the IB host terminal (TPA: 1.1.1.1), along with its source packet address (SPA: 1.1.1.3), and hardware address (SHA: H3) information. The ARP request packet broadcast by the Ethernet host terminal 160 is switched by the Ethernet switch 150 and reaches both gateway 110 and gateway 120.

Again, gateway 110 and gateway 120 perform a load balancing routine to determine which gateway will handle the data traffic associated with the ARP request packet from the Ethernet host terminal 160. That is, in one embodiment, since the data traffic associated with the ARP request packet is received at the Ethernet port of the gateway 110 and gateway 120, the destination IP address associated with the ARP request packet (for example, IP address of the IB host terminal, 140A-1.1.1.1) is used to determine which of the two gateways 110 and 120 will handle the associated data traffic. As in the previous example above, in one embodiment, apply the hash function described above, since the IP address of the IB host terminal 140A (IP: 1.1.1.1) corresponds to the hexadecimal integer value 0x01010101 which, when divided by the number of gateways (two in this case), returns a remainder value of one (1), the gateway associated with an identification parameter (ID) corresponding to the remainder value of one (1) is determined to handle the associated data traffic. That is, gateway 110 which as associated with the ARP request packet, and the gateway 120 is configured to drop the ARP request packet.

Thereafter, gateway 110 is configured to generate an entry in the address table associated with the received ARP request packet from the Ethernet host terminal 160 based on the source IP address (SPA) and the source hardware address (SHA) of the received ARP request packet(for example, SPA: 1.1.1.3, and SHA: H3). In addition, gateway 110 is configured to update its query table to generate a query associated with the received ARP request packet. That is, in one embodiment, an associated query entry is generated which includes, for example, target protocol address (TPA) of the IB host terminal 140A, the source protocol address (SPA) of the Ethernet host terminal 160, the pot out information as the IB port, the port in information as the Ethernet port, and the status field (Flag) as "Pending". An example of the query table entry is shown below:

TABLE 4

Gateway 110 Query Table

| ID | TPA     | SPA     | Port Out | Port In  | Flag    |
|----|---------|---------|----------|----------|---------|
| 1  | 1.1.1.1 | 1.1.1.3 | IB       | Ethernet | Pending |

Furthermore, the gateway 110 is configured to broadcast the ARP request to the associated IB host terminal 140A, where the ARP request includes target protocol address of the IB host terminal 140A (TPA: 1.1.1.1), and the source protocol address (SPA) of the gateway 110 (SPA: 1.1.1.10), and the source hardware address of the gateway 110 (SHA: H10). The IB host terminal 140A is configured in one embodiment to receive the broadcast ARP request from the gateway 110, and to transmit a unicast ARP reply back to gateway 110, where the unicast ARP reply is associated with a target protocol address (TPA) of the gateway 110 (TPA: 1.1.1.10), and the source protocol address (SPA) and hardware address (SHA) of the IB host terminal 140A (for example, SPA: 1.1.1.1, and SHA: H1).

The gateway 110 in one embodiment is configured to receive the ARP reply from the IB host terminal 140A and to resolve the associated entry in the query table by, for example, setting the status field (Flag) to "0". In addition, the gateway 110 is configured to update the address table associated with the ARP reply from the IB host terminal 140A, for example, having an IP address of 1.1.1.1 and the hardware address of H1. An example of the address table for the gateway 110 is shown below:

TABLE 5

Gateway 110 Address Table

| ID | IP Address | Hardware Address | Port     | Flag |
|----|------------|------------------|----------|------|
| 1  | 1.1.1.3    | H3               | Ethernet | 0    |
| 2  | 1.1.1.1    | H1               | IB       |      |

Moreover, the gateway 110 is further configured to send the ARP reply from the IB host terminal 140A to the Ethernet host terminal 160, with the target protocol address (TPA) of the Ethernet host terminal 160 (TPA: 1.1.1.3), the source protocol address of the IB terminal 140A (SPA: 1.1.1.1), and the source hardware address (SHA) of the gateway 110 (SHA: H10.Eth). The Ethernet host terminal 160 is configured to receive the ARP reply from the gateway 110 which is switched by the Ethernet switch 150, and thereafter, the generate an ARP entry associated with the received ARP reply, such that subsequent data traffic is configured to use the hardware address of the gateway 110 (H10.Eth) to communicate with the IB host terminal 140A.

In this manner, in one embodiment of the present invention, the IP address of the IB side host terminals are used to determine which gateway to handle the traffic regardless of the direction of the data traffic. For example, in one aspect, data traffic originating from the IB side hosts to the Ethernet side, the source IP address is used to determine which gateway will handle the traffic. On the other hand, for data traffic originating from the Ethernet side hosts to the IB side hosts, the destination IP address is used to determine which gateway will handle the traffic. Accordingly, in one embodiment, traffic between a pair of hosts between the IB network and the Ethernet network may be configured to use a fixed Infiniband-to-Ethernet gateway regardless of where the data traffic originates. Accordingly, in accordance with one embodiment of the present invention, load balancing may be achieved in layer two gateway using ARP relay.

Figure 2:
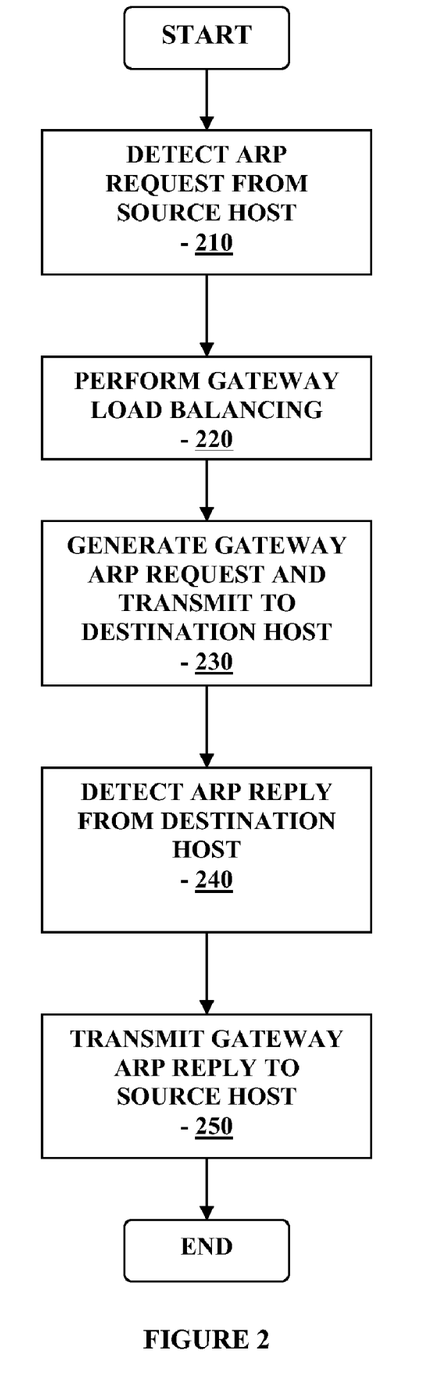
FIG. 2 is a flowchart illustrating the overall process for providing load balanced traffic in redundant IB-to-Ethernet gateways of the data network shown in FIG. 1 in one embodiment of the present invention.

FIG. 2. is a flowchart illustrating the overall process for providing load balanced traffic in redundant IB-to-Ethernet gateways of the data network shown in FIG. 1 in one embodiment of the present invention. Referring to FIG. 2, at step 210, an ARP request from a source host terminal is detected. Thereafter, at step 220, load balancing is performed based on, for example, the IP address information associated with the received ARP request. After performing load balancing to determine which gateway will handle the data traffic associated with the ARP request from the source host terminal, in one embodiment, a gateway ARP request is generated and transmitted to the destination host.

Referring back to FIG. 2, in response to the gateway ARP request transmitted to the destination host, at step 240 and ARP reply is received from the destination host associated with the gateway ARP request. Thereafter, at step 250, a corresponding gateway ARP reply is generated based on the ARP reply received from the destination host, and thereafter, the gateway ARP reply is transmitted to the source host.

Figure 3:
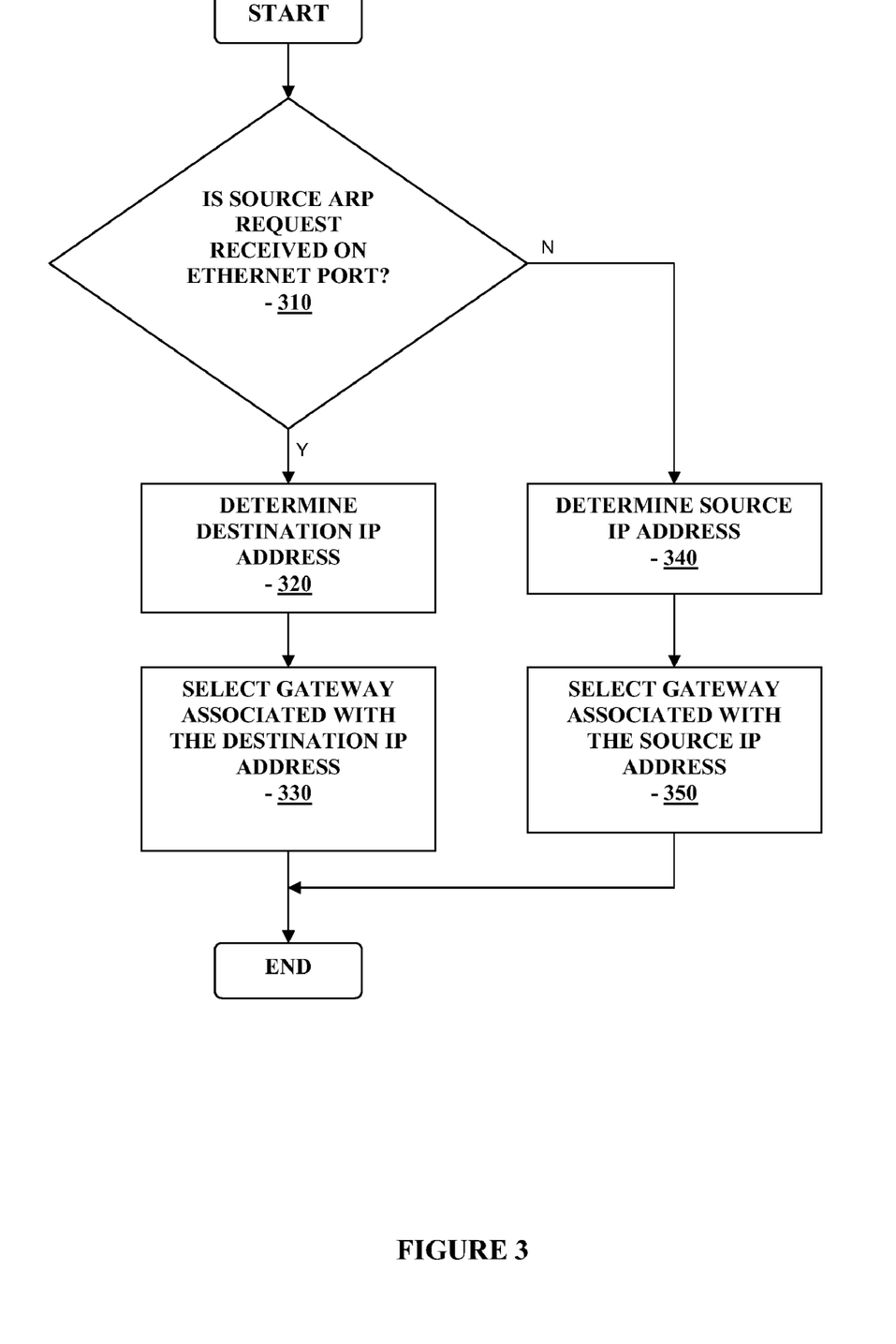
FIG. 3 is a flowchart illustrating the load balancing procedure in the redundant IB-to-Ethernet gateways of the data network shown in FIG. 1 in one embodiment of the present invention.

FIG. 3 is a flowchart illustrating the load balancing procedure in the redundant IB-to-Ethernet gateways of the data network shown in FIG. 1 in one embodiment of the present invention. Referring to FIG. 3, the load balancing procedure of step 220 (FIG. 2) in one embodiment includes determining whether the ARP request is received at the Ethernet port of, for example, the gateways (110, 120). If at step 310 it is determined that the ARP request is received at the Ethernet port of the gateway, at step 320, the destination IP address of the data traffic associated with the ARP request is determined. Thereafter, at step 330, the gateway associated with the destination IP address is selected to handle the data traffic associated with the ARP request.

Referring back to FIG. 3, if at step 310 it is determined that the source ARP request is not received on the Ethernet port of the gateway (110, 120), then at step 340, the source IP address of the data traffic associated with the ARP request is determined. Thereafter, at step 350, the gateway associated with the source IP address is determined to handle the data traffic associated with the ARP request.

Figure 4:
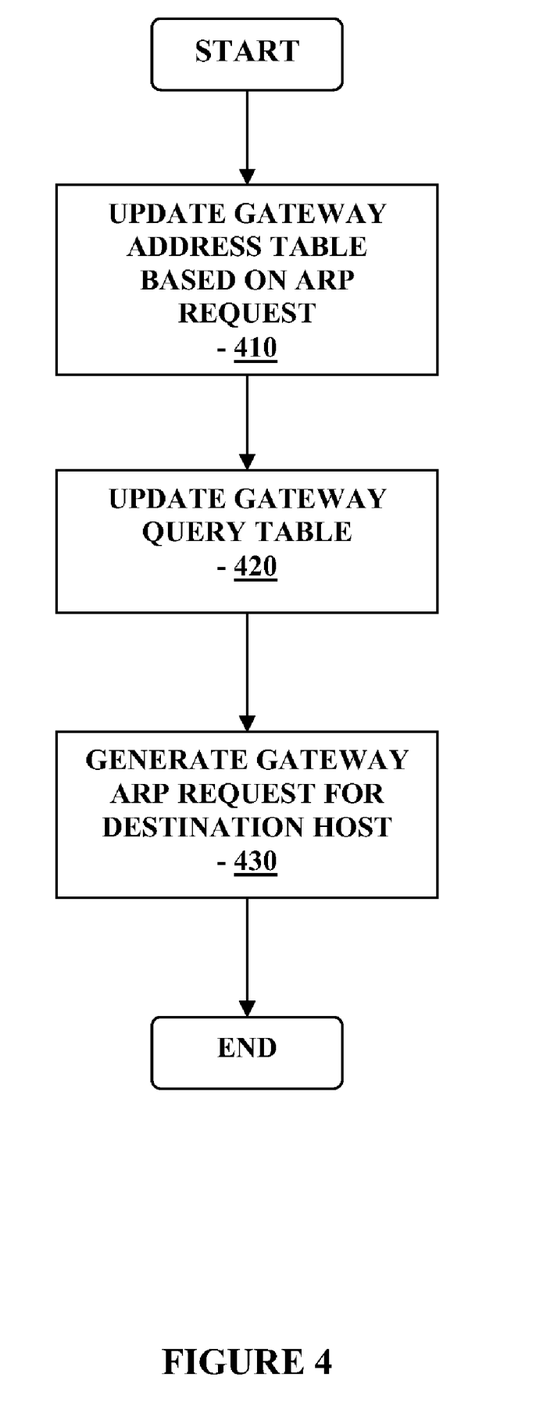
FIG. 4 is a flowchart illustrating the process for generating the ARP request for destination host in the data network shown in FIG. 1 in one embodiment of the present invention.

FIG. 4 is a flowchart illustrating the process for generating the ARP request for destination host in the data network shown in FIG. 1 in one embodiment of the present invention. Referring to FIG. 4, at step 410, upon receipt of the ARP request, the address table of the selected gateway for handling the data traffic associated with the ARP request is updated based on the information associated with the ARP request as discussed above. Thereafter, the query table of the gateway is updated based on the information associated with the ARP request. Thereafter, the gateway ARP request is generated for broadcast to the destination host terminal, where, as discussed above, the gateway ARP request includes in one embodiment, the source protocol address of the gateway for transmission to the destination host terminal.

Figure 5:
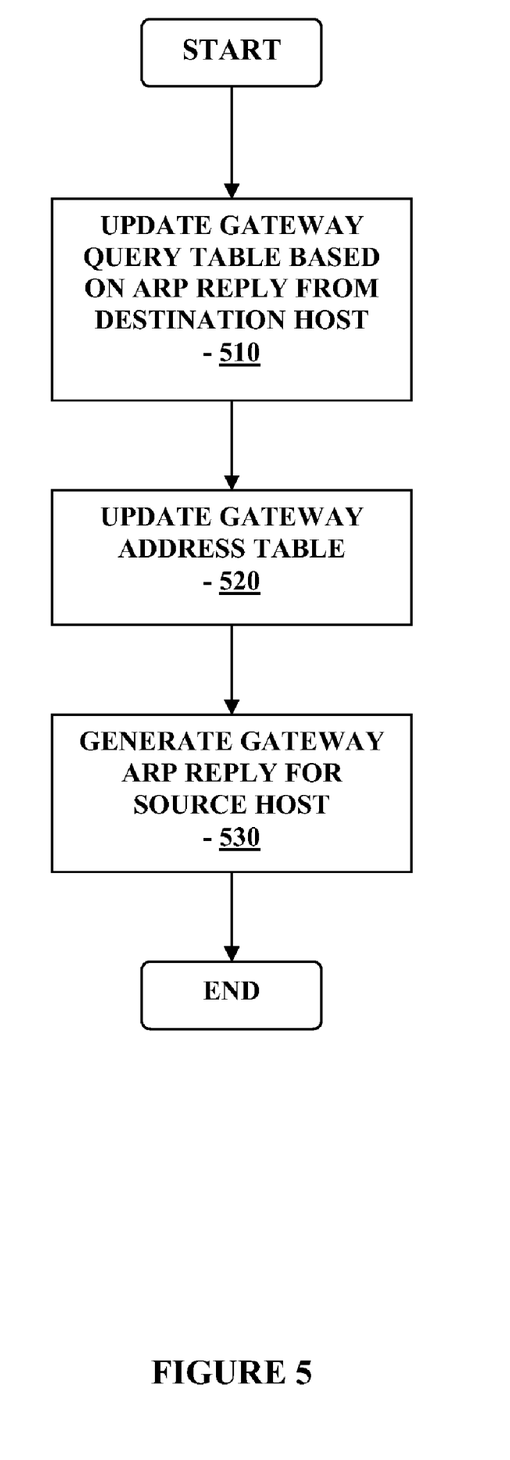
FIG. 5 is a flowchart illustrating the process for generating the ARP reply for source host in the data network shown in FIG. 1 in one embodiment of the present invention.

FIG. 5 is a flowchart illustrating the process for generating the ARP reply for source host in the data network shown in FIG. 1 in one embodiment of the present invention. Referring to FIG. 5, at step 510, the query table of the gateway determined to handle the data traffic associated with the ARP request is updated based on the ARP reply received from the destination host terminal. Thereafter, at step 520, the address table of the gateway is updated based on information associated with the received ARP reply, and a corresponding gateway ARP reply is generated for broadcast to the source host terminal of the data traffic. For example, in one embodiment, the gateway ARP rely broadcast to the data traffic source host terminal includes the gateway hardware address (GHA), and the source protocol address (SPA) of the destination host terminal, while the target protocol address (TPA) includes the IP address of the source host terminal.

In this manner, in accordance with the various embodiments of the present invention, there are provided methods and system for load balancing in layer two gateways using ARP relay. Accordingly, in one embodiment, data traffic between a pair of hosts between the IB network and the Ethernet network may be configured to use a fixed Infiniband-to Ethernet gateway regardless of where the data traffic originates. Within the scope of the present invention, additional number of gateways greater than two may be implemented in the Infiniband-to-Ethernet network, and where load balancing may be performed to select the respective gateway to handle the data traffic associated with the predetermined ARP request packet.

Accordingly, a method for providing load balancing in a data network in one embodiment includes detecting a data transmission request, determining a predetermined interface information associated with the data traffic request, and performing load balancing based on the predetermined interface information associated with the data traffic request.

In one aspect, the predetermined interface information may include an Internet Protocol (IP) address of a host terminal in an Infiniband network.

The step of performing the load balancing may include selecting one or more of a plurality of network gateways to handle the data transmission request, where the one or more pluralities of network gateways may include Infiniband-to-Ethernet gateways.

In a further aspect, the data traffic request may include an address translation protocol (ARP) request packet, where the ARP request packet may be associated with a target protocol address, a source protocol address and a source hardware address.

In yet a further aspect, the selecting step may include modifying the source protocol address associated with the ARP request packet.

The method in a further embodiment may include the step of updating one or more of a query table or an address table associated with a network gateway.

Further, in still another aspect, the method may include the step of receiving an address translation protocol (ARP) reply packet, where the ARP request packet may include a unicast reply.

Also, the ARP reply packet may be associated with a target protocol address, a source protocol address, and a source hardware address.

A system for providing load balancing in an Infiniband-to-Ethernet network in accordance with another embodiment includes a network interface section including a plurality of gateway terminals, each of the plurality of gateway terminals including a respective Ethernet interface and an Infiniband interface, the network interface section further configured to detect a data traffic request, and in accordance therewith, to select one of the plurality of gateway terminals for handling the detected data traffic request based on an Internet Protocol (IP) address associated with an Infiniband network host terminal associated with the data traffic request.

The host terminal in one embodiment may be configured to transmit the data traffic request to the network interface section.

The Infiniband network host terminal may be configured to receive one or more data associated with the data traffic request.

Furthermore, each of the plurality of gateway terminals may be an Infiniband-to-Ethernet gateway terminal. Moreover, in another aspect, non-selected gateway terminals of the plurality of gateway terminals may be configured to enter an inactive mode.

The data traffic request may include an address translation protocol (ARP) request packet, where the ARP request packet may be associated with a target protocol address, a source protocol address and a source hardware address.

The selected one the plurality of gateway terminals may be configured to modify the source protocol address associated with the ARP request packet.

Moreover, the selected one of the plurality of gateway terminals may be configured to update one or more of a query table or an address table associated with the data traffic request.

In still another aspect, the system may include one or more Infiniband switch or an Ethernet switch operatively coupled to the network interface section.

A system for providing load balancing in a data network in accordance with yet another embodiment includes means for detecting a data transmission request, means for determining a predetermined interface information associated with the data traffic request, and means for performing load balancing based on the predetermined interface information associated with the data traffic request.

The various processes described above including the processes performed by the gateway 110, 120, and the IB host terminals 140A, 140B, the Ethernet host 160, the IB switch 130, and the Ethernet switch 150, in the software application execution environment in the data network 100 including the processes and routines described in conjunction with FIGS. 2-5, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the respective gateway 110, 120, the Ethernet host 160, the IB switch 130, and the Ethernet switch 150 may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for providing load balancing in a data network having a plurality of network gateway devices, comprising:
   receiving, at a first network gateway device located in the data network, a broadcast data traffic request, the broadcast data traffic request including an address of a host in an InfiniBand network;
   executing, by a processing component of the first network gateway device, a load balancing algorithm that takes the address of the host as an input and produces an output;
   comparing the output to a predetermined value stored at a memory of the first gateway device; and
   based on the comparing, either forwarding the broadcast data traffic request from the first network gateway device, or discarding without forwarding the broadcast data traffic request at the first network gateway device, wherein
   only one of the network gateway devices of the data network forwards the broadcast data traffic request.

2. The method of claim 1 wherein the address of the host is an Internet Protocol (IP) address.

3. The method of claim 1 wherein the first network gateway device is an Infiniband-to-Ethernet gateway.

4. The method of claim 1 wherein the broadcast data traffic request is an address translation protocol (ARP) request packet.

5. The method of claim 4 wherein
   the ARP request packet includes a target protocol address, a source protocol address and a source hardware address, and
   the address of the host in the InfiniBand network corresponds to either the target protocol address or the source protocol address of the ARP request packet.

6. The method of claim 5 further comprising replacing the source protocol address of the ARP request packet with an address of the first network gateway device.

7. The method of claim 1 further comprising updating one or more of a query table or an address table stored at the memory of the first network gateway device.

8. The method of claim 1 further comprising receiving an address translation protocol (ARP) reply packet.

9. The method of claim 8 wherein the ARP reply packet includes a unicast reply.

10. The method of claim 8 wherein the ARP reply packet includes a target protocol address, a source protocol address, and a source hardware address.

11. The method of claim 1 wherein the forwarding or discarding include:
    forwarding the data traffic request from the first gateway device, if the output matches the predetermined value; and
    discarding without forwarding the data traffic request, if the output fails to match the predetermined value.

12. The method of claim 1 wherein the predetermined value is an identification (ID) parameter associated with the first network gateway device.

13. The method of claim 2 wherein the ID parameter corresponds to a number assigned to the first network gateway device out of a total number of network gateway devices.

14. The method of claim 1 wherein the load balancing algorithm includes applying a hash function to the address of the host, and the output is an index value.

15. A system for providing load balancing in an InfiniBand-to-Ethernet network comprising:
    a network gateway device including:
      at least one InfiniBand interface,
      at least one Ethernet interface,
      a memory configured to store a value, and
      at least one control processing component coupled to the at least one InfiniBand interface, the at least one Ethernet interface, and the memory, the at least one control processing component configured to:
        receive a data traffic request from either the at least one InfiniBand interface, or the at least one Ethernet interface, the data traffic request containing an address of an InfiniBand host,
        execute a load balancing algorithm utilizing the address of the InfiniBand host to generate a result,
        compare the result with the value stored in the memory,
        forward the data traffic request provided that the result matches the value stored in the at least one memory, and
        discard without forwarding the data traffic request if the request does not match the value stored in the memory, wherein
        a discarded data traffic request is forwarded by another network gateway device that also received the data traffic request.

16. The system of claim 15 wherein the data traffic request originates from either an InfiniBand host or an Ethernet host.

17. The system of claim 15 wherein data traffic request is an address translation protocol (ARP) request packet.

18. The system of claim 17 wherein the ARP request packet includes a target protocol address, a source protocol address and a source hardware address.

19. The system of claim 18 wherein the at least one control processing component of the network gateway device is further configured to:
replace the source protocol address of the ARP request packet with an address of the network gateway device.

20. The system of claim 15 wherein
the network gateway device further includes one or more of a query table or an address table stored in the memory, and
the at least one control processing component is further configured to update the one or more of the query table or the address table based on information in the data traffic request.

21. A system for providing load balancing in a data network, comprising:
means for receiving, at a network gateway device located in the data network, a data traffic request, the data traffic request including an address of a host in an InfiniBand network;
means for executing, by a processing component of the network gateway device, a load balancing algorithm that takes the address of the host as an input and produces an output;
means for comparing the output to a predetermined value stored at a memory of the gateway device; and
means for either forwarding the data traffic request from the gateway device, or discarding without forwarding the data traffic request, based on a result of the comparing, wherein
a discarded data traffic request is forwarded by another network gateway that also received the data traffic request.

* * * * *

UNITED STATES PATENT AND TRADEMARK OFFICE
CERTIFICATE OF CORRECTION

PATENT NO. : 7,724,746 B2  Page 1 of 2
APPLICATION NO. : 11/462024
DATED : May 25, 2010
INVENTOR(S) : Valtchev et al.

It is certified that error appears in the above-identified patent and that said Letters Patent is hereby corrected as shown below:

Col. 1, Line 29, please amend as shown:

layer[[ 2bridge]] 2 bridge, and ARP (Address Translation Protocol) relay

Col. 2, Line 37, please amend as shown:

[[in]]an IB interface and an Ethernet interface. More specifically, as

Col. 2, Line 50, please amend as shown:

table to map IP addresses[[,]] with hardware addresses. That is,

Col. 2, Line 62, please amend as shown:

over, the Ethernet host terminal 160 is[[ configures]] configured with an IP

Col. 3, Line 4, please amend as shown:

In addition, each of the gateways 110, 120 are configured to

Col. 3, Line 46, please amend as shown:

[[address(e.g., 1.1.1.1)]]address (e.g., 1.1.1.1) to a corresponding hexadecimal integer Col. 1, Line 58, please amend as shown:

col address (SPA) and the source hardware[[ address(SHA)]] address (SHA). In

Col. 3, Line 62, please amend as shown:

(TPA)(IP address: 1.1.1.3), source protocol address(SPA)(IP) (TPA) (IP address: 1.1.1.3), source protocol address (SPA) (IP)

Col. 4, Line 16, please amend as shown:

source hardware address (SHA) of H10Eth H10.Eth. That is, in one

Col. 4, Line 56, please amend as shown:

110(SHA: H10IB) 110 (SHA: H10.IB). The IB host terminal 140A then receives the

Col. 5, Line 31, please amend as shown:

As in the previous example above, in one embodiment, applying

Signed and Sealed this
Thirtieth Day of August, 2011

David J. Kappos
*Director of the United States Patent and Trademark Office*

CERTIFICATE OF CORRECTION (continued)

U.S. Pat. No. 7,724,746 B2

Col. 2, Line 39, please amend as shown:

gateway 110 which as associated <u>identification parameter (ID) of one (1) is configured to handle the data traffic associated</u> with the ARP request Col. 5, Line 46, please amend as shown:

(SHA) of the received ARP request[[ packet(for example,]] <u>packet (for example,</u> SPA:

Col. 5, Line 53, please amend as shown:

host terminal 160, the[[ pot]] <u>port</u> out information as the IB port, the

Col. 6, Line 34, please amend as shown:

protocol address of the IB <u>host</u> terminal 140A (SPA: 1.1.1.1), and

Col. 6, Line 59, please amend as shown:

FIG. 2[[.]] is a flowchart illustrating the overall process for

Col. 7, Line 5, please amend as shown:

request transmitted to the destination host, at step 240 an[[d]]

Col. 2, Line 26, please amend as shown:

the gateway<u>s</u> (110, 120), then at step 340, the source IP address

Col. 7, Line 56, please amend as shown:

the gateway ARP[[ rely]] <u>reply</u> broadcast to the data traffic source host

Col. 9, Line 16, please amend as shown:

cesses performed by the gateway<u>s</u> 110, 120, and the IB host

Col. 10, Line 34, Claim 13, please amend as shown:

13. The method of claim[[ 2]] <u>1</u> wherein the ID parameter cor-